Dec. 17, 1957     J. F. MARCHAND     2,816,862
ELECTRODIALYZERS
Original Filed Dec. 10, 1949
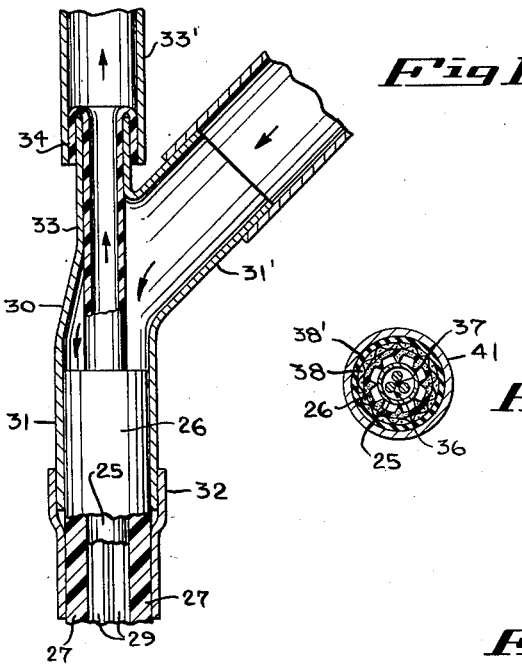
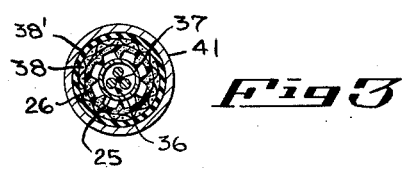
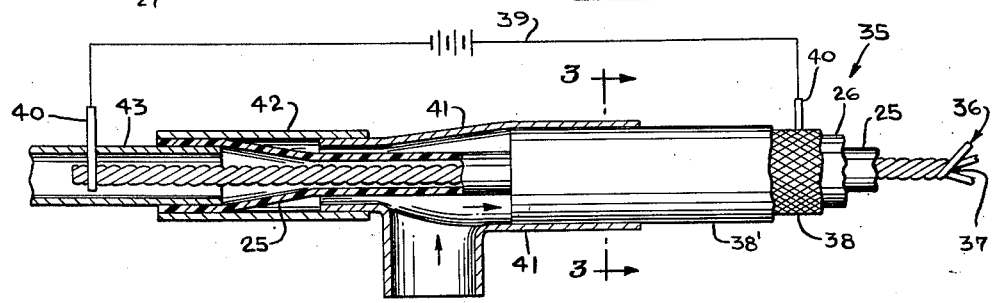
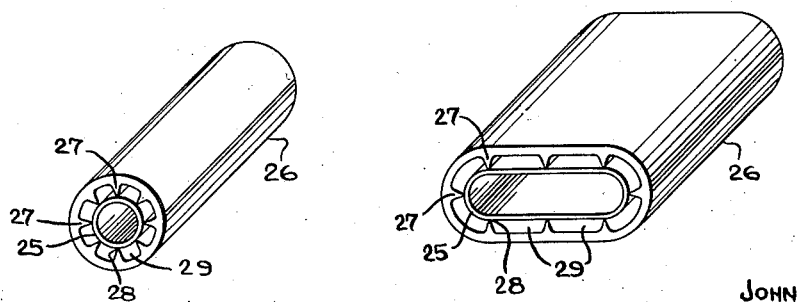
INVENTOR.
JOHN F. MARCHAND
BY Joseph F. Fallon
ATTORNEY

United States Patent Office 2,816,862
Patented Dec. 17, 1957

2,816,862

ELECTRODIALYZERS

John Felix Marchand, New York, N. Y.

Original application December 10, 1949, Serial No. 132,264, now Patent No. 2,687,997, dated August 31, 1954. Divided and this application April 16, 1954, Serial No. 423,634

9 Claims. (Cl. 204—301)

This application is a division of application Serial No. 132,264 filed December 10, 1949, now Patent No. 2,687,997.

In my co-pending application, Serial No. 112,037, now Patent No. 2,664,395, filed August 24, 1949, I have described, illustrated, and claimed novel types of dialyzers, illustrating their features, uses, and applications. Dialysis is the passage of diffusible ions or molecules through a selectively permeable intervening septum from one gaseous or liquid solution or mixture into another. The process is used in industry and in the laboratory for a variety of separations and purifications, depending on differences in diffusion coefficients of the component substances. Heretofore, small batches of liquids or gases have been customarily dialyzed in permeable membraneous bags immersed in a surrounding bath. For large quantities of materials to be separated by diffusion, a continuous flow process is preferable. Apparatus for large scale dialysis is exemplified by the cast-iron filter-press type dialyzers employed in the recovery of caustic soda from cellulose treating solutions. The manufacture and servicing of these large, cumbersome dialyzers is time consuming, laborious, and costly.

Tubular dialyzers of one or more membraneous tubes in a rigid outer vessel have been practically applied to a limited degree. However, there has been no fully satisfactory means for holding tubular membranes in proper alignment for optimum operating efficiency, nor has a convenient, low cost, disposable, flexible, tubular dialysis assembly heretofore been available.

In dialyzers of the prior art, notably filter-press type dialyzers, the dialysis membranes are supported at fixed edges. These points of support are subjected to strain as the membranes shrink, swell, or billow. The membranes frequently rupture or tear along these lines, or are sawed through by the supporting edges. Furthermore, except for tubular dialyzers, which lack means for holding the membranes in proper alignment, none of the continuous dialyzers heretofore in use are free of frictional resistance to flow in both the inner and outer circuits as a result of contact of the flowing streams with side walls, corners, grids, or other structures. The pressure gradients resulting from such friction limit dimensions and enhance the difficulty of holding delicate membranes in place without danger of rupture.

With the above in view, it is an object of my invention to overcome these and other disadvantages in the prior methods and equipment for continuous direct or counter-current dialysis assisted by electrical means.

Another object of my invention is to provide a highly efficient but easily made and readily disposable tubular, continuous electrodialyzer of novel design.

Another object of my invention is to provide novel means for manufacturing a novel type of tubular continuous type electrodialyzer.

Other objects and features of my invention will become apparent from the following detailed description, taken in connection with the accompanying drawings, in which:

Figure 1 is a sectional view of an assembly showing the invention as used with an adapter Y tube;

Figure 2 is a sectional view of another form of the invention used as an electrodialyzer;

Figure 3 is a cross-section taken on line 3—3 of Figure 2;

Figure 4 is a perspective view of a portion of the embodiment shown in Figure 1;

Figure 5 is a perspective view showing the flattened form of the embodiment in Figure 4.

Referring now to the drawings in which like reference characters denote like parts throughout, there is provided a novel adapter-fitting assembly 30 for connecting to the inner and outer tubes 25 and 26, respectively, of the tubular dialyzer. This adapter 30 may be a rigid or flexible, preferably transparent, Y tube made of material such as described in the aforesaid patents. The stem 31 of this Y tube fits snugly by a screwed or overlapped and tape-sealed connection 32 over the end of the outer tube or casing 26. The stem 31, together with the branch 31' of this tube, is approximately as large in diameter as the tube 26 and serves as a distributing manifold, permitting a flow of the same pressure to or from all the outer channels 29 between the beads or fins. In the rigid form, for example in glass or metal, the axial branch 33 of this Y tube 30 is made with an external diameter very slightly smaller than that of the inner membraneous tube 25. The end of the inner membraneous tube is drawn through this axial branch 33, and folded back around the edges to be held firmly in a leak-proof connection by a flexible tube 34 of rubber or plastic fitted over this branch. On the other hand, if this Y member 30 is made flexible, as of rubber or polyvinylite, then the end of the inner membrane tube which has been drawn through the axial branch of the Y, as above, is next drawn like a stocking over the smooth end of a glass or metal or other fairly solid tube used for connecting to the inner circuit. In the latter case, this solid tube connection is then forced into the membraneous tube far enough to force the outer surface of this inner membraneous tube tightly against the elastic inner wall of the Y tube branch 34 to form a liquid or gas-tight seal. Whether the Y shaped end fitting 30 is flexible or rigid, it is made with the axial branch 34 of the Y member in the same axis as the stem 31 in order to avoid buckling or pinching the flexible inner membraneous tube 25 as it passes through the end fitting.

If the dialyzer is to be operated under conditions such that the hydrostatic pressure in the inner tube 25 is not always above that of the outer circuit in the outer tube 26, the inner membrane tube must be extruded or mounted around an inner supporting element or grid, preferably a spring grid comprising a fine wire spiral, or one of the spring grids as specified in the co-pending application Serial Number 112,037, filed August 24, 1949. Whenever possible, however, it is desirable to omit such a grid in order to leave as much as possible of the membrane surface free for dialysis, and to limit all frictional resistance in the inner circuit to that arising from contact with the dialyzing membrane itself.

As a modification of my invention hereinabove described and illustrated, I provide an electrodialyzer assembly 35, as shown in Fig. 2 of the accompanying drawings. In this assembly, there is provided an inner supporting core 36 within flexible inner tube 25 of dialysis-membrane. This core 36 is made wholly or partly of metal or other electrically conducting material. An outer covering or winding 38 of metallic foil or wire or other suitable conducting material is provided which is incorporated within the outer tube or casing 26 or is applied around it. It will be noted that an electrical conducting, longitudinally or spirally grooved or corrugated metal tube may be employed as the outer tube or casing 26 of the dialyzer assembly and that two or more twisted wires may serve as the supporting element 36 within the lumen of the flexible inner dialysis tube 25. The grooves defined by the twisted wires 36 forming the inner core serve as channels conducting the inner dialyzing stream in a path in intimate contact with the membraneous walls of the tubular dialyzing membrane 25, and these wires are therefore twisted around a soft inner strand 37 of rubber or plastic which fills all the space between these wires except the spiral grooves through which the streams are to run.

The outer electrical pole or layer 38 may be applied as a metallic coat or winding around the outer beaded tube or casing 26 of the dialyzer, either during or after the extrusion of the internally beaded tube and its contents. However, for the greatest economy and simplicity in manufacture and use, it is preferred that the internally beaded tube 26 of the dialyzer be itself made an electrical conductor. This is accomplished by mixing threaded or particulate conducting material, such as carbon or metal, into the liquid matrix which is to be extruded, or by electro-plating the beaded tube, or by otherwise depositing on the surface of the extruded tube 26 a film of metal or other good electrical conductor.

In the embodiment shown in Fig. 2 and Fig. 3, it will be noted that innermost soft rubber or plastic filament 37, about which strands of metal wire 26 are wound, helps define several spiral grooves or crevices through which the innermost dialyzing solution is to flow. Around this spirally grooved, electrically conducting, flexible membrane support is extruded the flexible, transparent, seamless, selectively permeable, tubular dialyzing membrane 25, which conducts the innermost of the solutions to be dialyzed. Around this permeable inner tube and its contents is extruded an internally beaded, flexible, transparent or translucent outer tube or casing 26. The straight longitudinal beads 27 of the outer tube cannot encroach within or obstruct the channels within the inner tube because the channels within the inner tube are in a spiral. Around this outer tube 26, which may be of polyethylene, is wound a strand of metallic wire 38 between the coils of which it is possible to see through the translucent outer case and observe thereby whether the channels inside are properly filled and free of bubbles. An electrically insulating layer 38' of transparent varnish or plastic is applied or extruded over the outer surface of this electrodialyzer.

An electrical circuit 39, either A. C. or D. C., is provided by means of a wire connection to the outer conducting layer 38, and to the inner conducting core 36 by a terminal 40 through the wall of the inlet or outlet tube connecting with the inner channels. The modified embodiment is provided with a T tube 41, preferably made of glass. This T tube is adapted as an end fitting to permit easy connections for the core 36, outer casing 26, conductor 38 and insulation 38'. In this construction, glass has desirable physical and chemical properties and permits visual observation. A flexible rubber or plastic tubing section 42 is provided for interconnecting the tube 25 and a glass connector tube 43.

When this device is operated as an electrodialyzer, a potential difference is set up between the inner and outer electrical elements. This difference in electrical potential causes ions or electrically charged molecules to diffuse in a predominantly axial or radial direction, depending on the sign of their respective electrical charges, by a process known as electrophoresis. The direction and magnitude of the potential difference so applied may therefore be used to encourage or accelerate dialysis selectively with respect to substances of different electrical charges. When the inner and outer electrical elements are connected to an ordinary reciprocating alternating current source, sustained electrophoresis in one direction does not occur but diffusion in both directions to the point of equilibrium is accelerated by the alternating forces which result from the reciprocating fields so established.

Electrodialysis by alternating current is applicable to many of the procedures ordinarily accomplished by simple dialysis and so enhances the efficiency of the process that a smaller dialysis device may be employed to accomplish the same task in a shorter time. Electrodialysis by direct current is applicable to the separation of ions or molecules of differing electrical charge. This separation is accomplished by electrophoresis through a semipermeable membrane. When the solution in the inner or outer circuit is capable of conducting electricity, the electrical connection may be made directly to the solution, with the result that the inner or outer electrical elements 36 or 38 may be omitted.

In the application of a dialyzer described herein and made according to my invention, solutions or gases to be dialyzed enter one end of the innermost tube and flow through in the opposite direction to that of the outer streams of gas or solution against which the innermost stream is being dialyzed. The outermost streams pass through the channels between the longitudinal beads or fins in the outer tube. The two systems of liquids or gases are therefore separated from one another by the semipermeable or selectively permeable wall of the innermost tube. Although this inner tubular membrane may be rigid or opaque in special applications, there are evident advantages to the preferred embodiments of my invention employing a flexible, transparent inner membrane, for example, cellulose or a cellulose derivative. During the passage of these innermost and outermost streams over the inner and outer surfaces of the inner tube, those substances which can diffuse through the membrane, pass from one solution to the other at rates depending on their respective chemical and physical properties and their thermal kinetic activities. This diffusion process approaches completion or equilibrium when the tubular dialyzer is made sufficiently long as a unit or as a series of units, or when the solutions or gases under treatment are recirculated through a relatively short section of such a dialyzer. The efficiency or completeness with which this dialyzer achieves equilibrium is therefore dependent, in part, on its length. The capacity of the system, on the other hand, is determined by the number of such units operated in parallel. The ease with which the simple flexible units of this dialyzer assembly may be connected or disconnected by ordinary methods permits easy installation and convenient adjustment of the efficiency and capacity of such a system to the needs of the moment.

From the foregoing description, taken in connection with the accompanying drawings, it will be noted that I provide a dialyzer assembly and method of making and using same comprising an extruded, flexible, translucent, compact, lightweight, easily connected, easily operated, strong, microfilm dialyzer unit. This dialyzer is workable as a unit or as an assembly of standardized units which may conveniently be discarded after use or damage and replaced from spare stocks on hand, as needed. The parts of this dialyzer include a tough but flexible, chemically inert, translucent, extruded outer tube or casing and novel end fittings for connecting to the inner and outer circuits of this continuous counter-current dialyzer.

A novel, extruded, tubular dialyzer is provided by my invention having an efficiency in operation beyond that attainable with prior types of equipment made possible by the fact that, in this new design, the counter-current streams to be equilibrated against one another by passage over a semipermeable membrane may be made very shallow. This important microfilm feature, which is not available in prior types of dialyzers, eliminates dead space and provides a very steep concentration gradient favorable to rapid diffusion and an early attainment of diffusion-equilibrium across the membrane. The unusually small or shallow streams which may be conducted over the dialyzing membrane by this device are made possible by the fact that it is practicable to make the entire assembly either very small and narrow, or large but flattened.

This microfilm feature is an important advance in dialyzer design in more than one respect. In reducing or eliminating dead space, meaning space where the stream is not in intimate contact with the membrane, it reduces or eliminates the tendency of part of the stream to pass through without reaching the membrane at all. In this novel microfilm dialyzer, the usual eddy currents and back diffusion between dialyzed and not yet dialyzed portions of the stream are minimized by the narrowness of the dimensions involved. Steeper concentration gradients and more rapid diffusion across the membranes are therefore made possible because the dialyzed portions of the stream are not allowed to mix with the portions of the stream which have not yet been dialyzed.

An important advantage of this dialyzer is that in the inner circuit frictional resistance to flow is limited to that resulting from contact of the stream with the dialyzing membranes themselves.

Another advantage of major importance in this invention is the provision of a means of supporting the membranes gently in a way that permits swelling, shrinking, and billowing, or great strain with a greatly diminished risk of rupture.

Furthermore, the microfilm dimensions and streamlined configuration of the inner and outer channels of a dialyzer made according to my invention facilitate the washing through of bubbles or particles to a remarkable degree. The temperature and other conditions of manufacture are such that this dialyzer is made bacteriologically sterile and ready for use with fermentable solutions.

In my invention, it is to be noted that I may use well-known means of mechanical, sonic, and supersonic agitation of the dialysis membranes and of the solution being dialyzed or electrodialyzed. Although mechanical agitation is well known, sonic and supersonic agitators are a novel and highly effective means of expediting the process of electrodialysis. By such means of extremely rapid, fine wave treatment, the tendency of static layering of fluids against the dialysis membranes is minimized, overcoming some effects of friction and wetting or other attraction forces between fluids and membranes, hence the effective concentration gradients across the membranes are increased in a manner favoring more rapid diffusion and the process of dialysis is sped.

Among special applications of my invention, by way of illustration, the dialyzer described is conveniently and readily effective in permitting the gradual addition of reagents from one solution to another without the formation of high concentrations of the added reagent at any one point. An example of such a step done according to my invention is the addition of an acid to a protein solution to lower the pH value without denaturing portions of the protein solution. Also, protein solutions may be readily concentrated by dialysis according to my invention against dry air or other dehydrating agents. By concentrating proteins in this way, foaming is avoided, thereby avoiding foam denaturation of such protein.

The cited application to protein chemistry is given as an example of the numerous and varied uses which will be clear and evident to persons skilled in the art of dialysis.

This dialyzer invention is designed for adaptability, with proper modifications, to any or all of the general or special applications of the processes of dialysis and electrodialysis in batch or continuous operations.

It will be noted that the construction shown and described serves to accomplish the objects stated above. It is to be understood, however, that the construction disclosed above is merely intended as illustrative of the invention and not as limiting, as various modifications therein may be made without departing from the invention as defined by a proper interpretation of the claims which follow.

I claim:

1. A coaxial countercurrent electrodialyzer comprising an inner electro-conducting core, a continuous tube of a cellulose derivative spatially surrounding said core and contained within an internally radially ribbed jacket of relatively impermeable electro-conductive material, said ribs forming continuous longitudinal channels and having edges forming contact with the periphery of the tube when expanded.

2. An electrodialyzer for diffusible material comprising a core of metallic members, a flexible permeable member enclosing said metallic members and coaxial therewith, a non-permeable tubular electrical conducting member surrounding said permeable member, said tubular member having longitudinally extending ribs coaxial with the core, external means for insulating said non-permeable electrical conducting member, an electric circuit interconnecting the metallic members of the core and the outer non-permeable member, and a source of electric current for said circuit.

3. An electrodialyzer for diffusible material comprising a supporting core, metallic electro-conducting means twined around said core, a flexible permeable member coaxial with and spatially enclosing said metallic means adapted to conduct solutions of diffusible material therethrough, a non-permeable electrical conducting member surrounding said permeable member, said non-permeable member having longitudinally extending grooves surrounding the flexible member and forming spaced contact therewith, means for insulating said non-permeable member, an electric circuit interconnecting the metallic means of the core and the outer non-permeable member and a source of electric current for said circuit.

4. An electrodialyzer comprising a core, metallic members twined around the core and coaxial therewith, a flexible permeable member enclosing said metallic members, said permeable member adapted to conduct a stream of diffusible material therethrough, non-permeable electrical conducting means surrounding said permeable member and having internal radially extending longitudinal ribs forming intermediate channels around the permeable member, means insulating said non-permeable means, an electric circuit interconnecting the metallic members of the core and the outer non-permeable means, said metallic members being adapted to set up agitation of a solution of diffusible material passing through the permeable member to facilitate circulation of the solution around the metallic members and a source of electricity for the circuit.

5. An electrodialyzer for solutions containing diffusible material, said dialyzer comprising a core of twisted metallic members, a flexible permeable member surrounding said metallic members, a non-permeable electro-conducting member surrounding said permeable member, said non-permeable member having a plurality of longitudinal grooves whose walls make contact with the permeable member, electrical conducting means surrounding the non-permeable member, means for insulating said non-permeable member, an electric circuit interconnecting the metallic members of the core and the outer non-permeable member to facilitate electrophoresis of the ionizable material in the solution and a source of electricity for said circuit.

6. The combination with a dialyzer according to claim 5 of a T inlet shaped conduit means forming a connection not exceeding 90 degrees with the interior of the non-permeable member to permit the flow therethrough of wash fluid, and connecting means intermediate the T means and the electric circuit.

7. A T tube end manifold connection connecting to an inner membraneous tube and an internally ribbed firm but moderately flexible outer tube, said T tube comprising two axial branches and one lateral branch, one axial branch being enlarged to serve as a pressure and flow distributing manifold tending to equalize flow to or from the rib channels of the outer tube, said manifold branch being tightly fitted around the free end of said outer tube, said lateral branch communicating with said manifold branch, one of said axial branches carrying a continuation of said inner membraneous tube, said inner membraneous tube being fitted at its free end over the end of a connecting tube to form a union, said union being reinforced and sealed to said T tube, said manifold being provided with electrical terminal connections, and a conductor within the inner membraneous tube.

8. A coaxial countercurrent electrodialyzer comprising a core, an inner membraneous tube and a protecting internally ribbed electroconducting outer tube, end manifolds for said tubes, an electrical circuit for said core and internally ribbed outer tube, said outer tube being cylindrical at each end where it connects to the end manifolds but partially flattened along the remainder of its length.

9. A coaxial countercurrent electrodialyzer comprising an inner electroconducting core, a continuous internally ribbed tube of permeable material surrounding the core and forming with the core longitudinally extending channels therein, an outer enveloping tubular member surrounding the permeable tube and forming therewith an intermediate annular channel, said outer tubular member being an electroconducting member.

References Cited in the file of this patent

UNITED STATES PATENTS

| | | |
|---|---|---|
| 2,276,986 | Kemp et al. | Mar. 17, 1942 |
| 2,322,545 | Sandstrom | June 22, 1943 |
| 2,502,614 | Zender | Apr. 4, 1950 |

FOREIGN PATENTS

| | | |
|---|---|---|
| 555,471 | France | Mar. 23, 1923 |